US012711007B2

(12) United States Patent
Troutman et al.

(10) Patent No.: US 12,711,007 B2
(45) Date of Patent: Aug. 18, 2026

(54) FINALIZING AN INCOMPLETE MULTI-PART UPLOAD OBJECT BASED ON A FINALIZING CONDITION

(71) Applicant: Dell Products, L.P., Round Rock, TX (US)

(72) Inventors: Matthew Troutman, Cypress, TX (US); Yashas Tejnath, Lynnwood, WA (US); Brandon Tarquinio, Seattle, WA (US); Micah Priddis, Silverdale, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/424,336

(22) Filed: Jan. 26, 2024

(65) Prior Publication Data

US 2025/0245090 A1 Jul. 31, 2025

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC .......................... G06F 11/079; G06F 11/0709
See application file for complete search history.

(56) References Cited

U.S. PATENT DOCUMENTS

2019/0057027 A1* 2/2019 D'Halluin ........... G06F 12/0253
2020/0089574 A1* 3/2020 Miah ..................... G06F 16/285
2021/0096884 A1* 4/2021 Miller ................. G06F 16/2272
2021/0406231 A1* 12/2021 Lu ......................... G06F 3/0641
2022/0078236 A1* 3/2022 Yonekura .............. G06F 16/182
2023/0315582 A1* 10/2023 Anand ................ G06F 11/1461 711/162
2024/0396894 A1* 11/2024 Fisher ................ H04L 67/1097

* cited by examiner

*Primary Examiner* — Jigar P Patel
(74) *Attorney, Agent, or Firm* — Amin, Turocy & Watson, LLP

(57) ABSTRACT

The technologies described herein are generally directed toward finalizing an incomplete multipart data object based on a finalizing condition. According to an embodiment, a system can comprise a processor and a memory that can enable performance of operations including identifying an initializing of a multipart upload object. The operations can further include receiving a first upload part of upload parts of the multipart upload object. Further, the operations can include, based on a finalizing condition and before receiving a completion request, facilitating finalizing the multipart upload object.

20 Claims, 9 Drawing Sheets

FINALIZING AN INCOMPLETE MULTI-PART UPLOAD OBJECT BASED ON A FINALIZING CONDITION

BACKGROUND

In some implementations, a multi-part upload (MPU) describes a process by which a data object to be stored in an online object storage system can be uploaded in smaller, more manageable parts for uploading to the storage system. In some circumstances, an uploading system may stop uploading before all MPU parts have been uploaded. Detecting this stoppage and handling the incomplete MPU can often be complex and time consuming.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to identify an initializing of a multipart upload object. The system can include an additional instruction to receive a first upload part of upload parts of the multipart upload object. Additional instructions can include an instruction to facilitate, based on a finalizing condition and before receiving a completion request, finalizing the multipart upload object.

In additional or alternative embodiments, the finalizing condition can include passage of a period of time from identifying the initializing of the multipart upload object. In additional or alternative embodiments, the identifying of the initializing of the multipart upload object can include identifying a completion time for the finalizing of the multipart upload object, and the finalizing condition can include a current time corresponding to the completion time. In additional or alternative embodiments, the first upload part can include self-contained information that is independent of any other upload part of the upload parts.

In additional or alternative embodiments, the self-contained information of the first upload part does not overlap any other upload part of the upload parts. In additional or alternative embodiments, the multipart upload object is finalized, a second upload part of the upload parts has not been uploaded, and the multipart upload object can be finalized without the second upload part. In additional or alternative embodiments, the multipart upload object can be finalized without the second upload part and can be an incomplete multipart upload object without corrupted data. In additional or alternative embodiments, after the initializing, the multipart upload object can include an identifier, and wherein the finalizing condition is comprised in data stored in a storage location with the identifier.

In additional or alternative embodiments, the initializing of the multipart upload object can include receiving an initialization command from a client system, with the first upload part being received from the client system. In additional or alternative embodiments, the finalizing of the multipart upload object can be facilitated without a command to finalize the multipart upload object being received from the client system. In additional or alternative embodiments, the finalizing condition can occur based on the client system ceasing to upload the upload parts before completion of the upload of the upload parts.

An example method can comprise identifying an initializing of a multipart upload object. The method can further include receiving a first upload part of upload parts of the multipart upload object. Further, the method can, based on a finalizing condition and before completion of uploading the upload parts, facilitating finalizing the multipart upload object.

An example non-transitory computer-readable medium can comprise instructions that, in response to execution, cause a system comprising a processor to perform operations. These operations can comprise identifying an initializing of a multipart upload object. The operations can further include, based on the resource sharing communication, receiving a first upload part of upload parts of the multipart upload object. Further, the method can, based on a finalizing condition and before completion of uploading the upload parts, facilitating finalizing the multipart upload object.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate finalizing an incomplete multipart data object based on a finalizing condition. Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
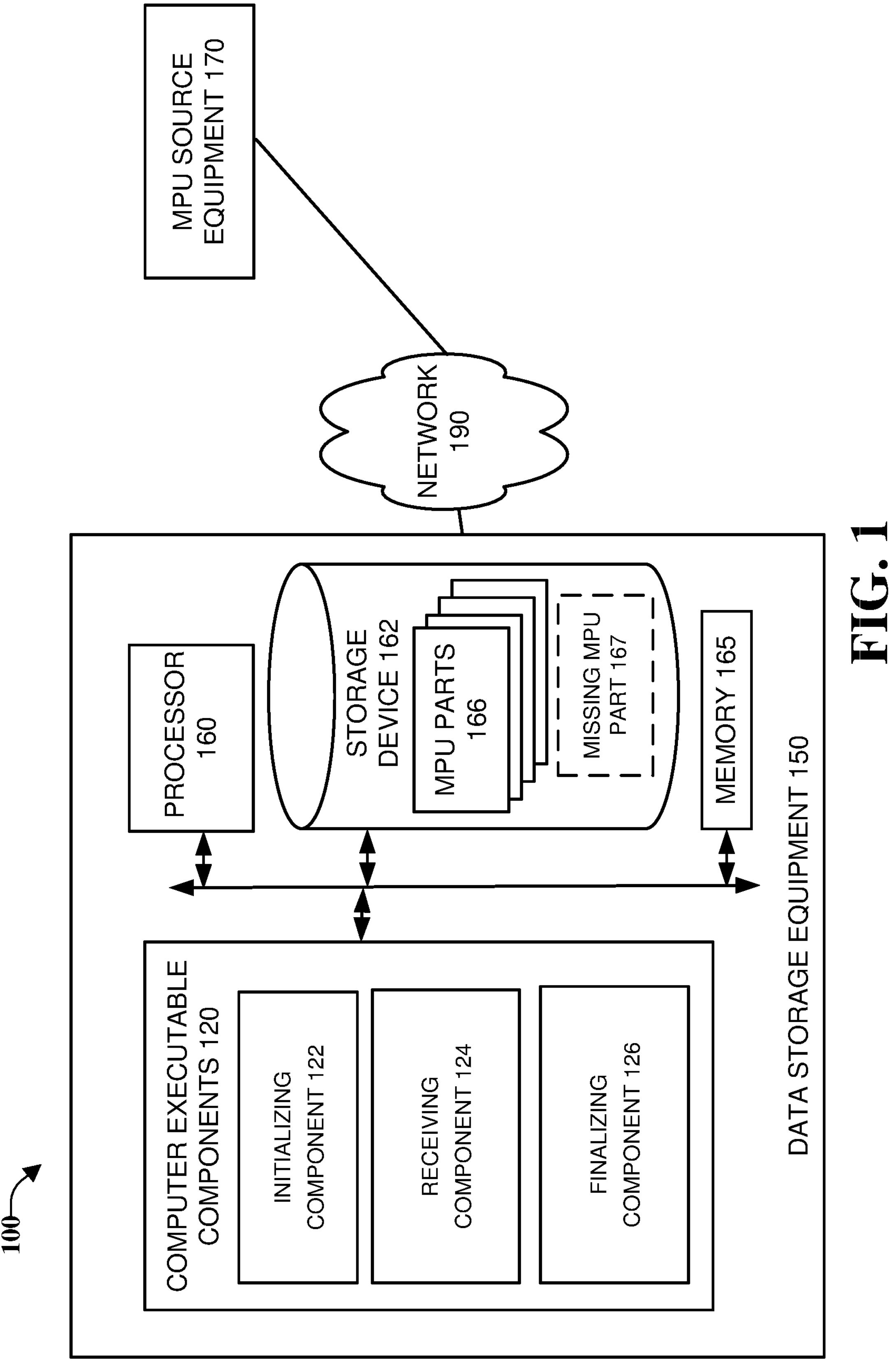
FIG. 1 is an architecture diagram of an example system that can facilitate finalizing an incomplete multipart data object based on a finalizing condition, in accordance with one or more embodiments.

FIG. 1 is an architecture diagram of an example system 100 that can facilitate finalizing an incomplete multipart data object based on a finalizing condition, in accordance with one or more embodiments. For purposes of brevity, description of like elements and/or processes employed in other embodiments is omitted. As depicted, system 100 includes data storage equipment 150 connected to MPU source equipment 170 via network 190. According to multiple embodiments, data storage equipment 150 can include memory 165 that can store one or more computer and/or machine readable, writable, and/or executable components 120 and/or instructions. Data storage equipment 150 includes storage device 162 that includes MPU parts 166 and a representation of a missing MPU part 167.

In embodiments, data storage equipment 150 can further include processor 160 and storage device 162. In one or more embodiments, computer executable components 120, when executed by processor 160, can facilitate performance of operations defined by the executable component(s) and/or instruction(s). Computer executable components 120 can include initializing component 122, receiving component 124, finalizing component 126, and other components described or suggested by different embodiments described herein, that can improve the operation of system 100.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 904 of FIG. 9. Such examples of processor 160 can be employed to implement any embodiment of the subject disclosure.

As discussed further with FIGS. 8-9 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 906 and FIG. 9. Such examples of memory 165 can be employed to implement any embodiments of the subject disclosure.

It is understood that the computer processing systems, computer-implemented methods, apparatus, and computer program products described herein employ computer hardware and/or software to solve problems that are highly technical in nature (e.g., managing large and complex multipart upload objects), that are not abstract and cannot be performed as a set of mental acts by a human. For example, a human, or even a plurality of humans, cannot efficiently perform different processes described herein with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to initializing component 122, receiving component 124, finalizing component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of initializing component 122, which can in some implementations, identify an initializing of a multipart upload object. For example, one or more embodiments can utilize initializing component 122 to identify an initializing of a multipart upload object from MPU source equipment 170. This MPU can be incrementally uploaded in MPU parts 166, stored in storage device 162. In one or more embodiments, the initialization command can be specific to the initialization of a time constrained system generated (TCSG) MPU, e.g., completing an MPU not only based on a completion indication from MPU source equipment 170, but also based on a finalizing condition that is based on a time constraint, as described herein. In additional or alternative embodiments, finalizing conditions other than those based on a time passing may also be used, including, but not limited to, a size of the uploaded parts, a number of uploaded, parts, a time of day, and/or other finalizing conditions selected for different purposed.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 124, which can in some implementations, can receive a first upload part of upload parts of the multipart upload object. For example, one or more embodiments can utilize receiving component 124 to receive a first MPU part of MPU parts 166 of the MPU from MPU source equipment 170. In one or more embodiments, the MPU uploaded from MPU source equipment 170 can be hidden until the MPU is completed, e.g., visible after finalizing with a completion command.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of finalizing component 126, which can in some implementations, can, based on a finalizing condition and before completion of uploading the upload parts, facilitating finalizing the multipart upload object. For example, one or more embodiments can utilize finalizing component 126 to, based on a finalizing condition and before completion of uploading all of MPU parts 166 of the MPU (e.g., missing MPU part 167), facilitating finalizing the multipart upload object, e.g., as with a COMPLETE_MPU command.

It is appreciated that the embodiments of the subject disclosure depicted in various figures disclosed herein are for illustration only, and as such, the architecture of such embodiments are not limited to the systems, devices, and/or components depicted therein. For example, in some embodiments, data storage equipment 150 can further comprise various computer and/or computing-based elements described herein with reference to operating environment 900 and FIG. 9. In one or more embodiments, such computer and/or computing-based elements can be used in connection with implementing one or more of the systems, devices, components, and/or computer-implemented operations shown and described in connection with FIG. 1 or other figures disclosed herein.

It should be noted that data storage equipment 150 can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as data storage equipment 150.

Figure 2:
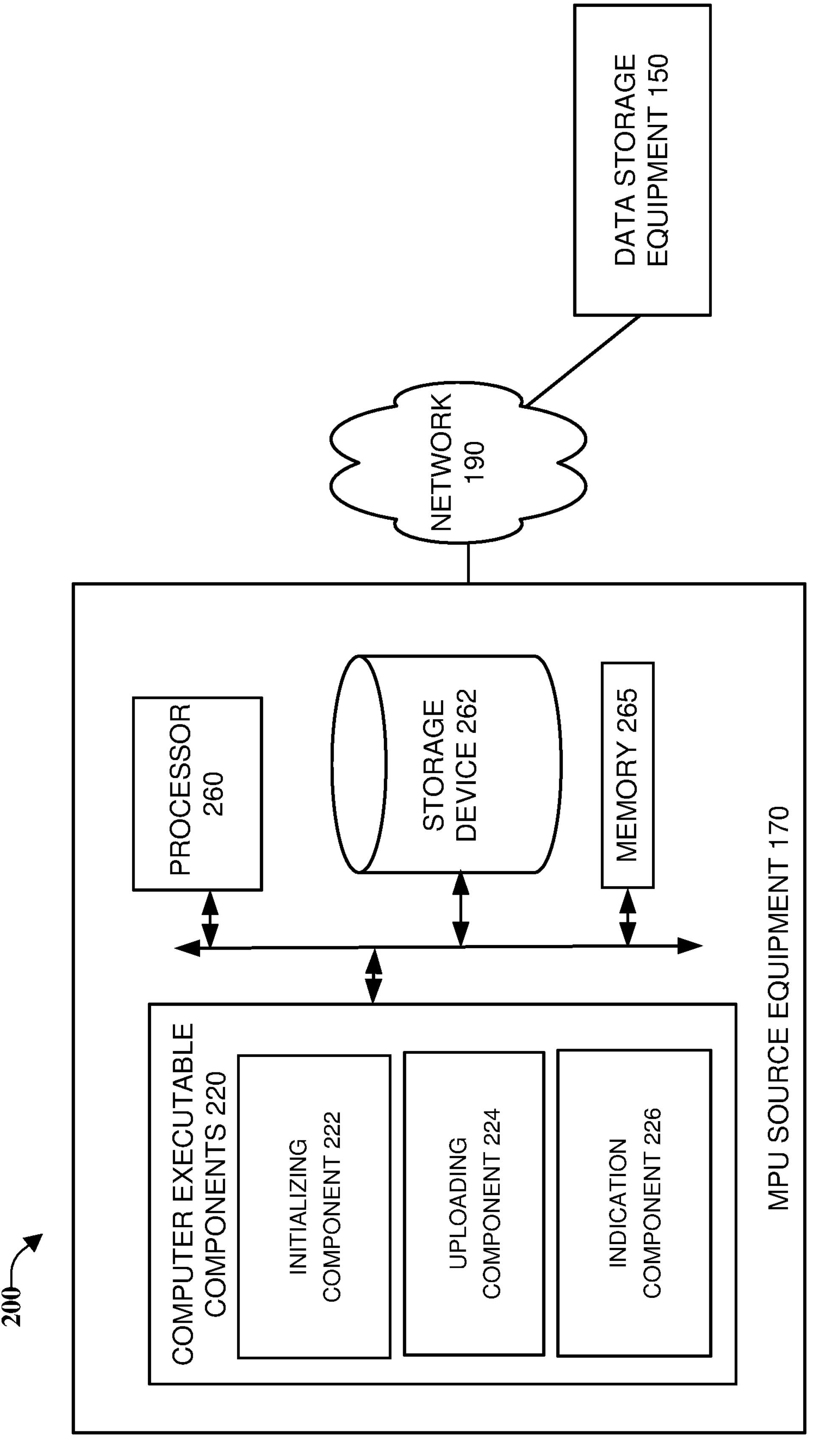
FIG. 2 is an architecture diagram of an example system that can facilitate uploading an incomplete multipart data object that is finalized based on a finalizing condition, in accordance with one or more embodiments.

FIG. 2 is an architecture diagram of an example system 200 that can facilitate uploading an incomplete multipart data object that is finalized based on a finalizing condition, in accordance with one or more embodiments. For purposes of brevity, description of like elements and/or processes employed in other embodiments is omitted. As depicted, system 200 includes data storage equipment 150 connected to MPU source equipment 170 via network 190.

In embodiments, MPU source equipment 170 can include processor 260 (e.g., similar to processor 160) and storage device 262, e.g., similar to storage device 162. According to multiple embodiments, data storage equipment 275 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including initializing component 222, uploading component 224, indication component 226, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of data storage equipment 275, memory 265 can store executable instructions that can facilitate generation of initializing component 222, which in some implementations, can initialize a multipart upload of a set of independent data parts at data storage equipment, with the set of independent data parts including a first portion of the set of independent data parts and a second portion of the set of independent data parts, different from the first portion. For example, MPU source equipment 170 can initialize an MPU to data storage equipment 150.

Continuing this implementation example, memory 265 can store executable instructions that can facilitate generation of uploading component 224, which in some implementations, can upload the first portion of the set of independent data parts to the data storage equipment. For example, MPU source equipment 170 can upload the first portion of the set of independent data parts to data storage equipment 150.

Continuing this implementation example, memory 265 can store executable instructions that can facilitate generation of indication component 226, which in some implementations, can, before uploading the second portion of the set of independent data parts, receive an indication that the multipart upload has been finalized in an incomplete state by the data storage equipment. For example, before uploading additional MPU parts 166, MPU source equipment 170 can receive an indication that the MPU has been finalized in an incomplete state by data storage equipment 150, e.g., because of an elapse of a period of time for the uploading of the MPU.

In alternative or additional embodiments, the operations can further include delaying further operations for a period of time after the uploading of the first portion of the set of independent data parts, and the finalizing condition can include an elapse of a period of time without a finalizing command having been received from the data storage equipment. In other embodiments, delaying further operations may continue for a period of time after an operation that initializes the MPU, and the finalizing condition can include an elapse of a selected period of time after the initialization of the MPU, without a finalizing command having been received from the data storage equipment. In one or more embodiments, the initialization of the MPU, and the commencement of uploading parts and/or the completion of a part, may be considered different events, with different implications for MPU finalization associated therewith.

With respect to the previous examples, and other examples described herein, it should be noted that, as used to describe one or more embodiments herein, a first portion of an MPU and a second portion of the MPU (and any other numerical reference to portions) should be considered non-limiting of the order in which the portions are received, processed etc., e.g., the initially received portion of the MPU (or any other portion of the MPU) can be received before the described "first portion" of the MPU. Further, in some examples described herein, a "second portion" of the MPU can be considered to represent an unreceived portion of the MPU, e.g., to illustrate that one or more embodiments may finalize an MPU after a finalizing condition occurs (e.g., a period of time has passed), and not just after an MPU has completed uploading and a finalizing request is issued by the uploading client.

Alternatively, one or more embodiments may finalize an MPU when, even though all portions of an MPU have been successfully uploaded, no finalizing request has been received from the uploading client, e.g., the storage device finalizes after the passage of the period of time, or other finalizing condition, occurs. Stated differently, in an example where the set of uploaded parts is equal to the set of all desired parts, the finalizing condition may still be met in the system (e.g., the period of time passes) and the upload may be finalized by the storage system instead of the client device. In other examples, one or more embodiments may handle an example circumstance where the set of uploaded parts is the empty set, in which case the finalizing logic may abort the upload, e.g., after a period of time passes.

Figure 3:
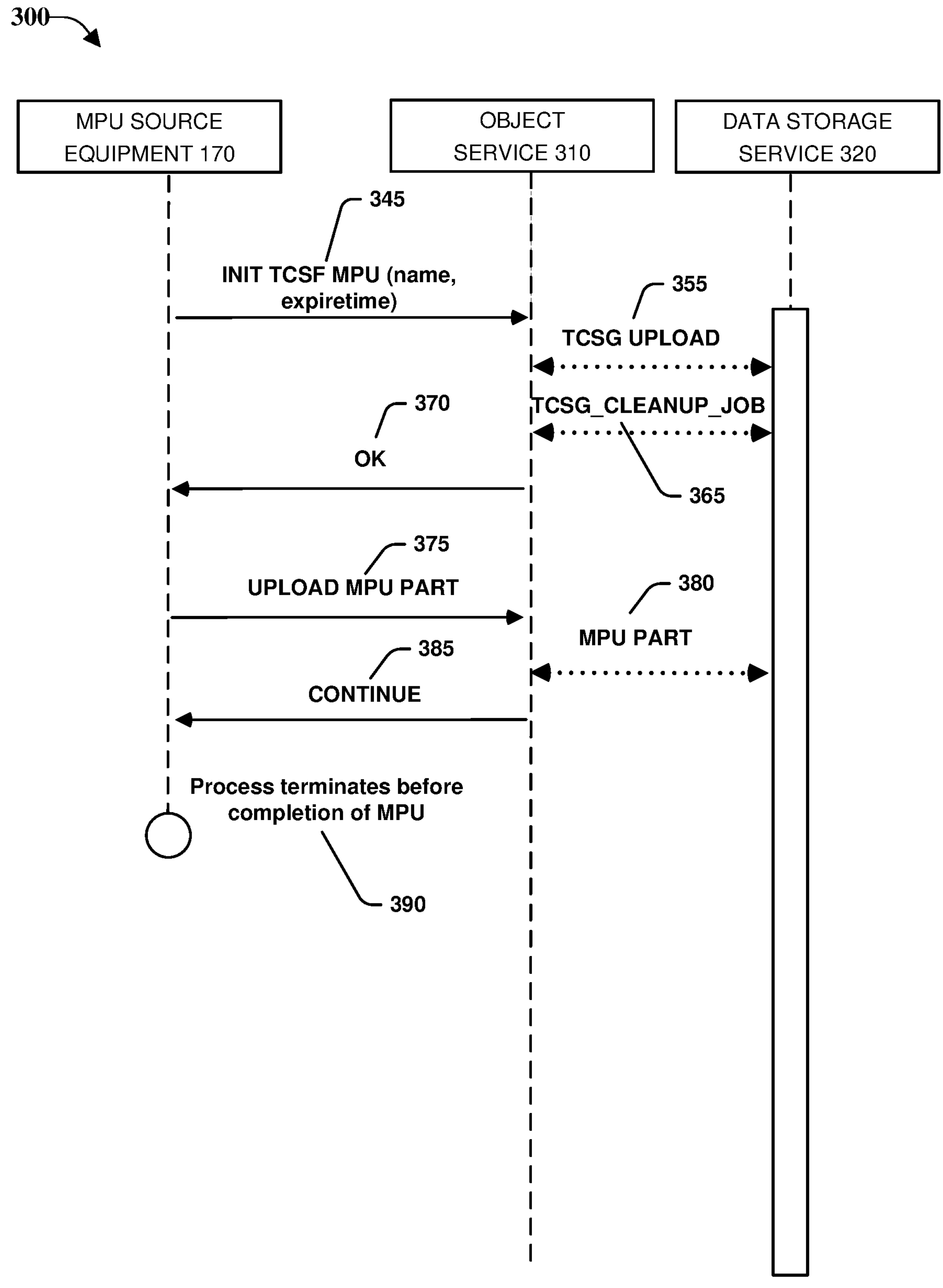
FIG. 3 depicts a part of an example sequence diagram of a system that can facilitate finalizing an incomplete multipart data object based on a finalizing condition, in accordance with one or more embodiments.
Figure 4:
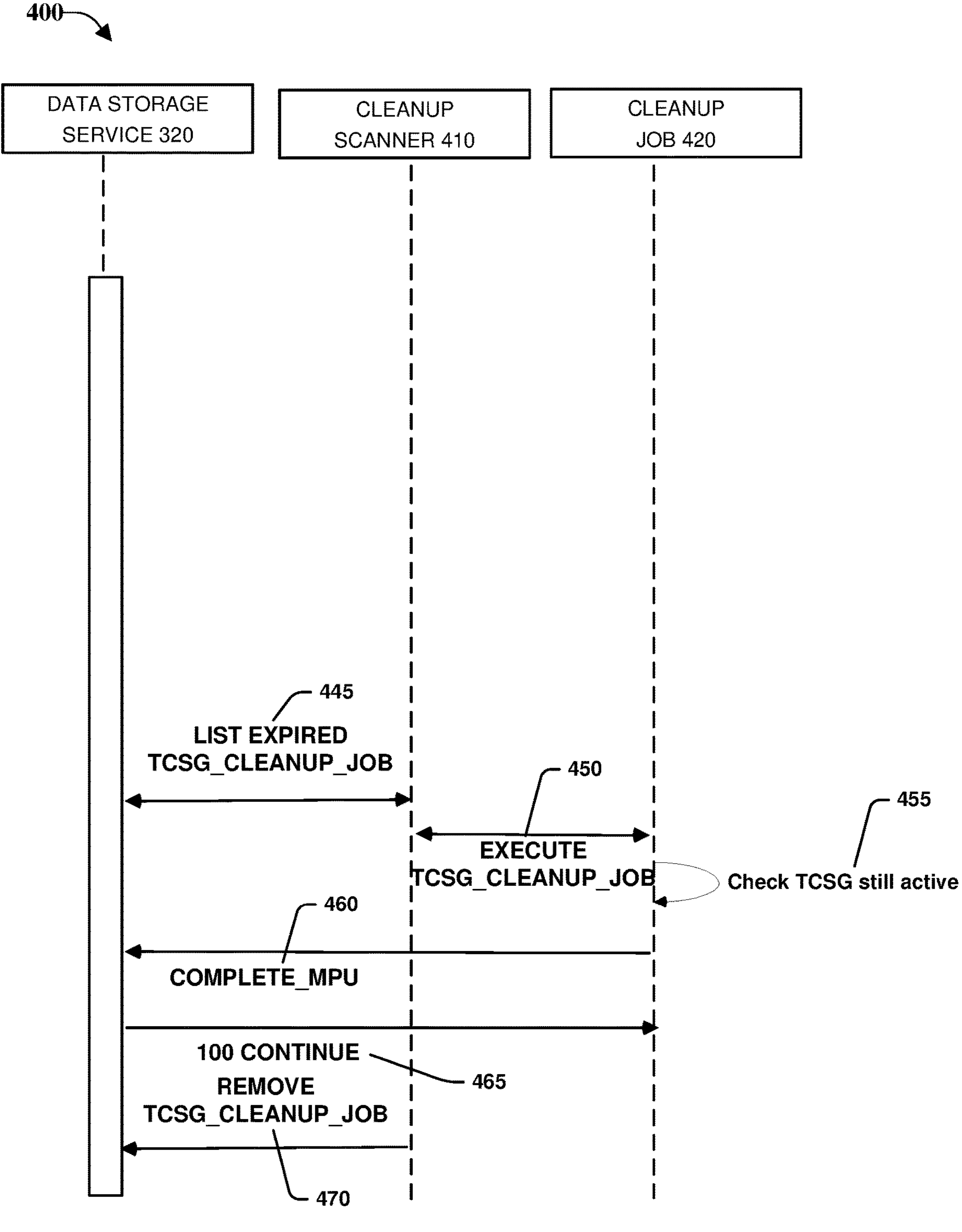
FIG. 4 depicts a part of the example sequence diagram of an example approach that can be used by the system to facilitate finalizing the incomplete multipart data object based on a finalizing condition, in accordance with one or more embodiments.

FIG. 3 depicts a part of an example sequence diagram of a system that can facilitate finalizing an incomplete multipart data object based on a finalizing condition, in accordance with one or more embodiments. FIG. 4 depicts a part of the example sequence diagram of an example approach that can be used by the system to facilitate finalizing the incomplete multipart data object based on a finalizing condition, in accordance with one or more embodiments. For purposes of brevity, FIGS. 3 and 4 are described in the following section, and the description of like elements and/or processes employed in other embodiments is omitted. As depicted, the example sequence diagram depicts an exchange of signals and data between MPU source equipment 170, object service 310, data storage service 320, cleanup scanner 410, and cleanup job 420.

At 345, a command to initialize an MPU is communicated from MPU source equipment 170 to object service 310, e.g., "INIT_TCSG_MPU (name, expiretime)." In this example, the command can identify the use of an embodiment described herein (e.g., "TCSG" in the command name), and the "expiretime" parameter corresponds to the finalizing condition discussed above. At 355, based on the command at 345, a command to initialize an MPU is communicated from object service 310 to data storage service 320, e.g., "TCSG_UPLOAD," and at 365, based on the command at 355, a command to initialize a cleanup job is communicated from data storage service 320 to object service 310, e.g., "TCSG_CLEANUP JOB." At 370, based on the command at 365, a confirmation is communicated from object service 310 command to initialize a cleanup job is communicated from data storage service 320 to object service 310, e.g., "OK."

At 375, based on the command at 370, a MPU part is uploaded from MPU source equipment 170 to object service 310, e.g., "UPLOAD MPU PART." In one or more embodiments, the upload parts handled include self-contained information that is independent of any other upload part of the upload parts, with this self-contained information not overlapping any other upload parts of the MPU. As described herein "self-contained MPU parts" (also termed "independent MPU parts") can have combinations of different characteristics that act to maintain that an upload part of an MPU (e.g., upload part N), does not require information from other upload parts of the MPU (e.g., upload part N+1 and/or N−1) in order for the upload part to be valid, complete, and/or useful to the MPU. In some circumstances this can facilitate the multipart upload object being finalized by embodiments as an MPU that has not had all of the MPU parts to have been uploaded, uploaded, e.g., an incomplete MPU whose partial collection of uploaded part is not corrupted data, and that can be utilized for the data that it contains.

At 380, based on the upload at 375, the MPU part is communicated from object service 310 to data storage service 320, e.g., "MPU PART." At 385, based on the upload at 380, the MPU part is communicated from object service 310 to MPU source equipment 170, e.g., "CONTINUE." At 390, the MPU part upload process terminates before completion of the MPU. At 445, e.g., "LIST EXPIRED TCSG CLEANUP JOB." AT 450, e.g., "EXECUTE TCSG CLEANUP JOB."

At 455, cleanup job 420 can check to determine if TCSG is still active. In one or more embodiments, this check can be a finalizing condition that causes additional activity by data storage service 320 detailed below, e.g., the finalizing condition occurs based on the client system ceasing to upload the upload parts before completion of the upload of the upload parts. Other, related finalizing conditions include, but are not limited to, the passage of a period of time from identifying the initializing of the multipart upload object, and a designate completion time for the finalizing of the multipart upload object. In one or more embodiments, the finalizing condition checked at 455 can be that the current time corresponds to, or is after, the completion time.

At 460, based the TCSG not being active and the finalizing condition being detected, a message from cleanup job 420 to complete the MPU is communicated to data storage service 320, e.g., "COMPLETE_MPU." In one or more embodiments, after the initializing, the multipart upload object can include an identifier, and the finalizing condition causes the uploaded MPU parts to be stored as a data object referenced by the identifier in a storage location. At 465, based the message at 460, a confirmation is communicated from data storage service message from data storage service 320 to cleanup job 420 to complete the MPU is communicated.

At 470, a "REMOVE TCSG_CLEANUP_JOB" command can be issued. For example, in one or more embodiments, the identifying of the initializing of the MPU object includes identifying a completion job that specifies the upload parts to be uploaded, and finalizing the multipart upload object comprises deactivating the completion job before the upload parts specified by the completion job have been uploaded.

Figure 5:
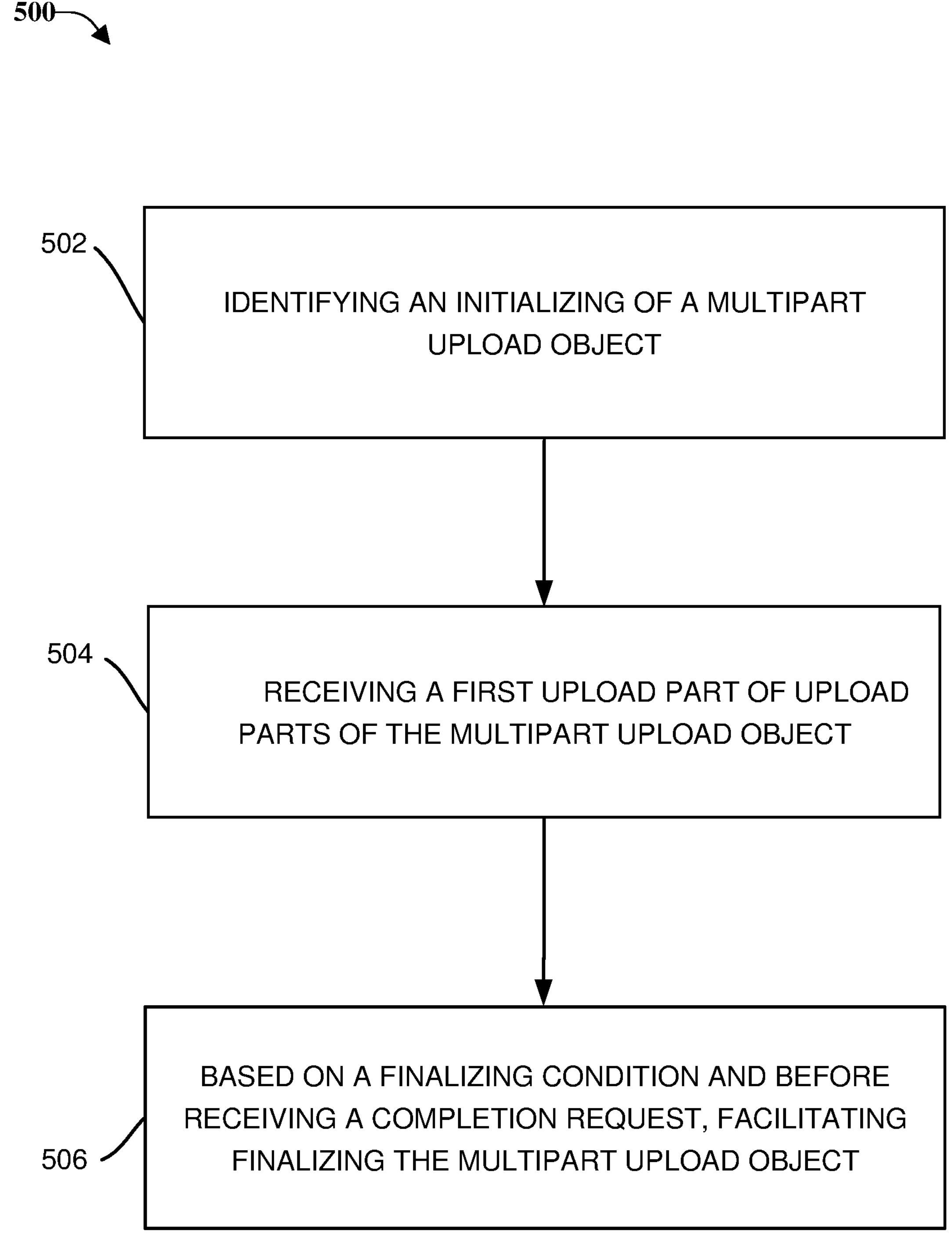
FIG. 5 depicts a flow diagram representing example operations of an example method 500 that can facilitate finalizing an incomplete multipart data object based on a finalizing condition, in accordance with one or more embodiments.

FIG. 5 depicts a flow diagram representing example operations of an example method 500 that can facilitate finalizing an incomplete multipart data object based on a finalizing condition, in accordance with one or more embodiments. For purposes of brevity, description of like elements and/or processes employed in other embodiments is omitted.

In some examples, one or more embodiments of method 500 can be implemented by initializing component 122, receiving component 124, finalizing component 126, and other components that can be used to implement aspects of method 500, in accordance with one or more embodiments. It is appreciated that the operating procedures of method 500 are example operating procedures, and that there can be embodiments that implement more or fewer operating procedures than are depicted, or that implement the depicted operating procedures in a different order than as depicted.

At 502 of method 500, initializing component 122 can include, in one or more embodiments, identifying an initializing of a multipart upload object. At 504 of method 500, receiving component 124 can include, in one or more embodiments, based on the resource sharing communication, receiving a first upload part of upload parts of the multipart upload object. At 506 of method 500, finalizing component 126 can include, in one or more embodiments, based on a finalizing condition and before receiving a completion request, facilitating finalizing the multipart upload object.

Figure 6:
FIG. 6 depicts an example system that can facilitate uploading an incomplete multipart data object that is finalized based on a finalizing condition, in accordance with one or more embodiments.

FIG. 6 depicts an example system 600 that can facilitate uploading an incomplete multipart data object that is finalized based on a finalizing condition, in accordance with one or more embodiments. For purposes of brevity, description of like elements and/or processes employed in other embodiments is omitted. Example system 600 can include initializing component 222, uploading component 224, indication component 226, and other components that can be used to implement aspects of system 600, as described herein, in accordance with one or more embodiments.

At 602 of FIG. 6, initializing component 222 can initialize a multipart upload of a set of independent data parts at data storage equipment, with the set of independent data parts including a first portion of the set of independent data parts and a second portion of the set of independent data parts, different from the first portion. At 604 of FIG. 6, uploading component 224 can upload the first portion of the set of independent data parts to the data storage equipment. At 606 of FIG. 6, indication component 226 can, before uploading the second portion of the set of independent data parts, receive an indication that the multipart upload has been finalized in an incomplete state by the data storage equipment.

Figure 7:
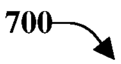
FIG. 7 depicts an example non-transitory machine-readable medium that can include executable instructions that, when executed by a processor of a system, facilitate finalizing an incomplete multipart data object based on a finalizing condition.

FIG. 7 depicts an example non-transitory machine-readable medium 700 that can include executable instructions that, when executed by a processor of a system, facilitate finalizing an incomplete multipart data object based on a finalizing condition. For purposes of brevity, description of like elements and/or processes employed in other embodiments is omitted.

Operation 702 of FIG. 7 can facilitate generation of initializing component 122, which, in one or more embodiments, can receive, from a client device, an indication to initialize a multipart upload object. Operation 704 of FIG. 7 can facilitate generation of receiving component 124 which, in one or more embodiments, can receive, from the client device, a portion of a group of upload parts of the multipart upload object. Operation 706 of FIG. 7 can facilitate generation of finalizing component 126 which, in one or more embodiments can, based on a condition and before receiving a completion request, complete the multipart upload object.

Figure 8:
FIG. 8 depicts an example schematic block diagram of a computing environment with which the disclosed subject matter can interact.
Figure 8:
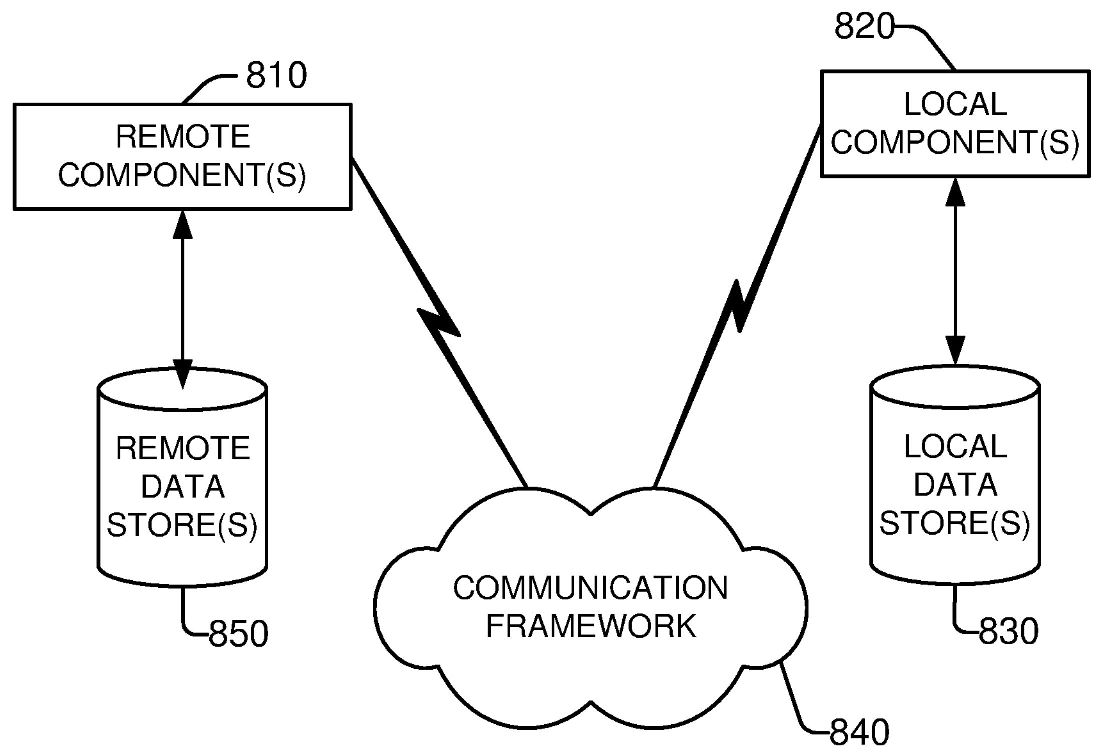

FIG. 8 is a schematic block diagram of a system 800 with which the disclosed subject matter can interact. The system 800 comprises one or more remote component(s) 810. The remote component(s) 810 can be hardware and/or software (e.g., threads, processes, computing devices). In some embodiments, remote component(s) 810 can be a distributed computer system, connected to a local automatic scaling component and/or programs that use the resources of a distributed computer system, via communication framework 840. Communication framework 840 can comprise wired network devices, wireless network devices, mobile devices, wearable devices, radio access network devices, gateway devices, femtocell devices, servers, etc.

The system 800 also comprises one or more local component(s) 820. The local component(s) 820 can be hardware and/or software (e.g., threads, processes, computing devices).

One possible communication between a remote component(s) 810 and a local component(s) 820 can be in the form of a data packet adapted to be transmitted between two or more computer processes. Another possible communication between a remote component(s) 810 and a local component(s) 820 can be in the form of circuit-switched data adapted to be transmitted between two or more computer processes in radio time slots. The system 800 comprises a communication framework 840 that can be employed to facilitate communications between the remote component(s) 810 and the local component(s) 820, and can comprise an air interface, e.g., Uu interface of a UMTS network, via a long-term evolution (LTE) network, etc. Remote component(s) 810 can be operably connected to one or more remote data store(s) 850, such as a hard drive, solid state drive, SIM card, device memory, etc., that can be employed to store information on the remote component(s) 810 side of communication framework 840. Similarly, local component(s) 820 can be operably connected to one or more local data store(s) 830, that can be employed to store information on the local component(s) 820 side of communication framework 840.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 820 (see below), non-volatile memory 822 (see below), disk storage 824 (see below), and memory storage, e.g., local data store(s) 830 and remote data store(s) 850, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 9:
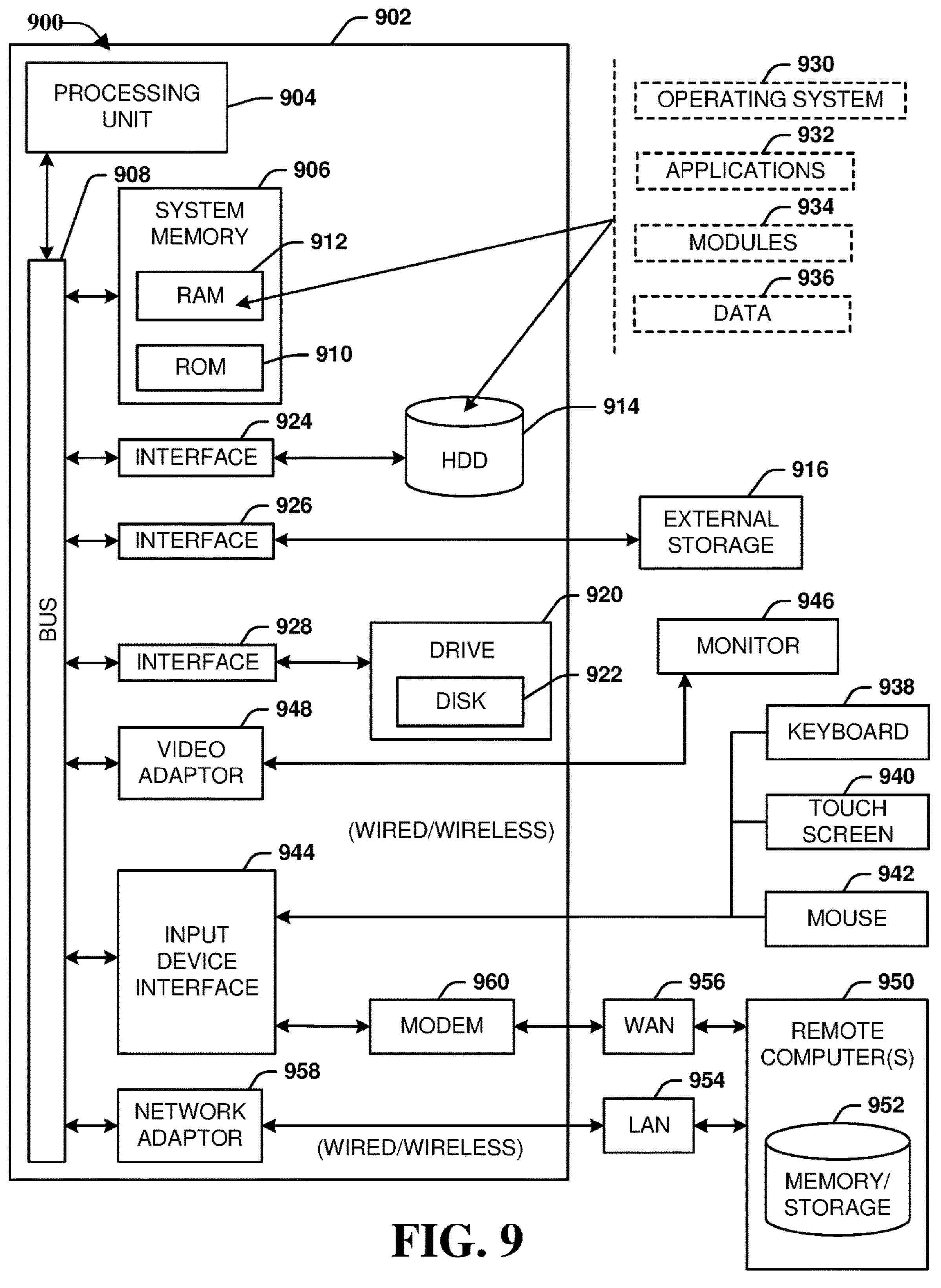
FIG. 9 illustrates an example block diagram of a computer operable to execute an embodiment of this disclosure.

Referring now to FIG. 9, in order to provide additional context for various embodiments described herein, FIG. 9 and the following discussion are intended to provide a brief, general description of a suitable computing environment 900 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising receiving, by a system comprising at least one processor from a client system, an initializing command applicable to initializing an upload of a multipart upload object from the client system, wherein the initializing command comprises finalizing information representative of a finalizing condition;

receiving, by the system from the client system, a first upload part of upload parts of the multipart upload object;

determining, by the system, an occurrence of the finalizing condition; and based on the occurrence of the finalizing condition and before receiving a completion request from the client system, facilitating, by the system, finalizing the multipart upload object.

2. The method of claim 1, wherein the finalizing condition comprises passage of a period of time from identifying the initializing of the multipart upload object.

3. The method of claim 1, wherein the finalizing information comprises a completion time for the finalizing of the multipart upload object, and wherein the occurrence of the finalizing condition comprises a current time corresponding to the completion time.

4. The method of claim 1, wherein the first upload part comprises self-contained information that is independent of any other upload part of the upload parts.

5. The method of claim 4, wherein the self-contained information of the first upload part does not overlap any other upload part of the upload parts.

6. The method of claim 1, wherein, when the multipart upload object is finalized, a second upload part of the upload parts has not been uploaded, and wherein the multipart upload object is finalized without the second upload part.

7. The method of claim 6, wherein the multipart upload object finalized without the second upload part comprises an incomplete multipart upload object without corrupted data.

8. The method of claim 1, wherein, after the initializing, the multipart upload object comprises an identifier, and wherein the finalizing condition is determined based on:

the finalizing information, and data stored in a storage location comprised in the identifier.

9. The method of claim 1, wherein the finalizing of the multipart upload object is facilitated without a command to finalize the multipart upload object being received from the client system.

10. The method of claim 1, wherein the finalizing event occurs based on the client system ceasing to upload the upload parts before completion of the upload of the upload parts.

11. The method of claim 1, further comprising:

receiving, by the system from object service equipment, a finalizing message, wherein the finalizing message was communicated by the object service equipment based on a checking, by the object service equipment, on the occurrence of the finalizing condition, wherein the occurrence of the finalizing condition was determined based on the finalizing message.

12. The method of claim 11, wherein the receiving of the initializing command from the client system comprises receiving the initializing command communicated from the client system via the object service equipment.

13. Data source equipment, comprising:

at least one processing unit; and at least one memory coupled to the at least one processing unit and storing instructions configured to be executed by the at least one processing unit, wherein the instructions, when executed by the at least one processing unit, cause the data source equipment to perform actions comprising:

initializing a multipart upload of a set of independent data parts at data storage equipment, wherein the initializing of the multipart upload comprises communicating a finalizing condition to the data storage equipment, and wherein the set of independent data parts comprises a first portion of the set of independent data parts and a second portion of the set of independent data parts, different from the first portion, uploading the first portion of the set of independent data parts to the data storage equipment, and before uploading the second portion of the set of independent data parts, receiving an indication that, based on the finalizing condition, the multipart upload has been finalized in an incomplete state by the data storage equipment.

14. The data source equipment of claim 13, wherein the multipart upload was finalized in the incomplete state by the data storage equipment based on the finalizing condition being identified by the data storage equipment.

15. The data source equipment of claim 14, wherein the instructions further comprise delaying further operations for a period of time after the uploading of the first portion of the set of independent data parts, and wherein the finalizing condition comprises elapse of the period of time without the uploading the second portion of the set of independent data parts.

16. The data source equipment of claim 14, wherein the communicating of the cleanup condition comprises communicating, to the data storage equipment, an identifier representative of a storage location, and wherein the finalizing condition is comprised in data stored in the storage location.

17. A non-transitory machine-readable medium comprising executable instructions that, when executed by at least one processor of a network controller device, facilitate performance of operations, the operations comprising:

receiving, from a client device, an indication to initialize a multipart upload object comprising finalizing information representative of a finalizing condition;

receiving, from the client device, a portion of a group of upload parts of the multipart upload object;

based on a cleanup process and the finalizing information, identifying that the finalizing condition has occurred; and based on the finalizing condition and before completion of uploading a remaining portion the group of upload parts, completing the multipart upload object.

18. The computer program product of claim 17, wherein the finalizing condition comprises passage of a period of time from the receiving of the indication to initialize the multipart upload object.

19. The computer program product of claim 17, wherein the finalizing information comprises information representative of a completion time for completing the multipart upload object, and wherein the finalizing condition comprises a current time corresponding to the completion time.

20. The computer program product of claim 17, wherein ones of the group of upload parts comprise encapsulated information that does not depend upon any other upload parts of the group of upload parts other than the ones, and wherein the encapsulated information does not overlap the other upload parts of the group of upload parts.

* * * * *